United States Patent
Fashchik et al.

(10) Patent No.: US 8,266,107 B2
(45) Date of Patent: Sep. 11, 2012

(54) METHOD FOR MIRRORING A LOG FILE BY THRESHOLD DRIVEN SYNCHRONIZATION

(75) Inventors: Ran Fashchik, Yokneam Ilit (IL); Eyal Gordon, Haifa (IL); Gary Valentin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/402,346

(22) Filed: Mar. 11, 2009

(65) Prior Publication Data
US 2010/0235326 A1  Sep. 16, 2010

(51) Int. Cl.
G06F 12/16 (2006.01)
G06F 17/30 (2006.01)

(52) U.S. Cl. ........... 707/656; 707/E17.005; 711/114; 714/1; 714/20

(58) Field of Classification Search .................. None
See application file for complete search history.

(56) References Cited

U.S. PATENT DOCUMENTS

| | | | |
|---|---|---|---|
| 6,026,440 A * | 2/2000 | Shrader et al. | 709/224 |
| 6,115,377 A * | 9/2000 | Lutz et al. | 370/391 |
| 7,167,963 B2 | 1/2007 | Hirakawa et al. | |
| 7,343,364 B2 * | 3/2008 | Bram et al. | 706/47 |
| 2006/0224375 A1* | 10/2006 | Barnett et al. | 703/22 |
| 2007/0073986 A1 | 3/2007 | Ninose et al. | |
| 2007/0168704 A1* | 7/2007 | Connolly et al. | 714/6 |
| 2007/0198700 A1* | 8/2007 | Vivian et al. | 709/224 |
| 2008/0049757 A1* | 2/2008 | Bugenhagen | 370/395.1 |

* cited by examiner

Primary Examiner — Shyue Jiunn Hwa
(74) Attorney, Agent, or Firm — Zilka-Kotab, PC

(57) ABSTRACT

A method for of accelerating database log hardening using specific per block data protection and damage control is provided. A per write specification is implemented to determine when database log data is mirrored synchronously or asynchronously. Synchronous mirroring is performed upon reaching a predetermined threshold, based on one or more parameters such as transaction value, both individual and cumulative, and the quantity of data written since the last synchronous mirroring. As data is added to the database log, it is written specifying asynchronous mirroring to the primary log file. Once a threshold is met, a write specifying synchronous mirroring is performed to both the primary and secondary log files, thereby hardening the log file in both primary and secondary storage subsystem.

21 Claims, 6 Drawing Sheets

METHOD FOR MIRRORING A LOG FILE BY THRESHOLD DRIVEN SYNCHRONIZATION

REFERENCE TO RELATED APPLICATION

The present invention is related to U.S. application Ser. No. 11/295,936, filed Jun. 30, 2008, entitled "System, Method And Computer Program Product For Performing A Data Protection Operation," which is incorporated herein by reference in its entirety.

BACKGROUND OF THE INVENTION

1. Field of the Invention

The present invention relates to the field of log file hardening, and more particularly, to a method of hardening a database log using specific block data protection and damage control parameters.

2. Background Information there is a clearly-felt need in the art for a method of hardening a database log using specific block data protection and damage control parameters.

SUMMARY OF THE INVENTION

In one embodiment, a method of mirroring log data from a primary storage subsystem to a secondary storage subsystem. The method comprising the steps of: identifying one or more parameters to be measured and performing a synchronous mirroring of the log data when the value of one of the one or more measured parameters exceeds a damage threshold.

In another embodiment, a computer program product for mirroring log data from a primary storage subsystem to a secondary storage subsystem. The computer program product comprising a computer usable medium having computer usable code embodied therewith, the computer program product comprising computer usable code configured for identifying one or more parameters to be measured and computer usable code configured for performing a synchronous mirroring of the log data when the value of one of the one or more measured parameters exceeds a damage threshold.

In one embodiment, a method of mirroring database transaction log data from a primary storage subsystem to a secondary storage subsystem. The method comprising the steps of measuring a first value of processed transactions after a most recent synchronous mirroring and performing a synchronous mirroring of the log data when the first value is greater than a damage threshold.

In a further embodiment, a method of mirroring database transaction log data from a primary storage subsystem to a secondary storage subsystem. The method comprising the steps of measuring a first value of the quantity of log data written to the primary storage subsystem after a most recent synchronous mirroring and performing a synchronous mirroring of the log data when the first value is greater than a damage threshold.

Other, advantages and embodiments of the invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
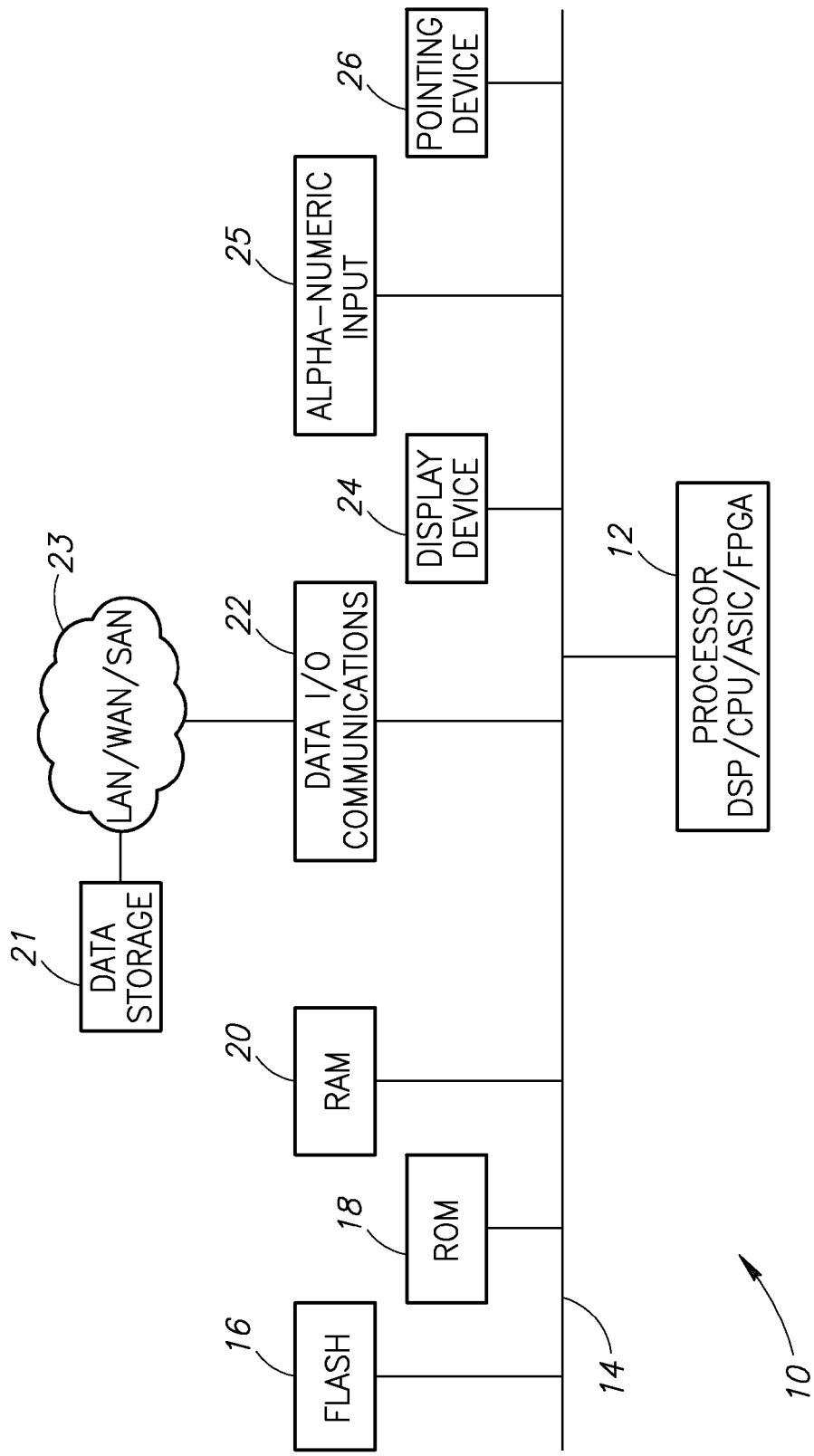
FIG. 1 is a block diagram illustrating an example computer processing system adapted to implement a threshold driven log synchronization method.

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Disclosed is a method of accelerating database log synchronization using specific defined thresholds. The threshold driven log synchronization method utilizes per write specification for disaster recovery that is generated using any suitable means. The method accelerates database log hardening using specific per block data protection and damage control. A per write specification is implemented to determine when database log data is mirrored synchronously or asynchronously. Synchronous mirroring is performed upon reaching a predetermined threshold, based on one or more parameters such as transaction value (both individual and cumulative) and the quantity of data written since the last mirroring. Asynchronous mirroring is performed at all other times.

In operation, one or more thresholds are set, which when met trigger a write specifying synchronous mirroring from the primary to the secondary database log file. As data is added to the database log, it is written specifying asynchronous mirroring to the primary log file and the counter for each threshold is updated to reflect the added log data. Once a counter reached its threshold, a write specifying synchronous mirroring is performed to the primary database log file. All data written to the primary database log file since the most recent synchronous mirroring is the mirrored synchronously to the secondary log files, thereby hardening the log file in both sites.

One application of the method is to facilitate the development of high performance database servers. Database servers implementing the threshold driven log synchronization method will reduce the number of synchronously mirrored writes used to minor critical data. Mirroring thresholds are set based on the level of risk acceptable to the user.

As will be appreciated by one skilled in the art, the invention may be embodied as a system, method, computer program product or any combination thereof. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a storage area network (SAN) or the connection may be made to an external computer (for example, through the Internet using an Internet Service Provider).

The method is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement a threshold driven log synchronization method is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as either a LAN, WAN or SAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the threshold driven log synchronization method is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the threshold driven log synchronization method may also reside, in whole or in part, in the static or dynamic main memories or in firmware within the processor of the computer system (i.e. within microcontroller, microprocessor or microcomputer internal memory).

Other digital computer system configurations can also be employed to implement the threshold driven log synchronization method, and to the extent that a particular system configuration is capable of implementing the system and methods of this invention, it is equivalent to the representative digital computer system of FIG. 1 and within the spirit and scope of the invention.

Once they are programmed to perform particular functions pursuant to instructions from program software that implements the system and methods of the invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Threshold Driven Log Synchronization

In accordance with the invention, one or more parameters are defined to indicate one or more specific damage thresholds. Examples of typical damage thresholds include financial exposure and storage amount. As data is ready to be added to the database log file, the method checks if the data to be added results in any of the defined thresholds to be met. When the threshold is not met, the data is written to the primary database log file specifying asynchronous mirroring (i.e. mirroring of the data will be asynchronous). Once a threshold is met, the data is written to the primary database log file specifying synchronous mirroring (i.e. mirroring will be synchronous), with the secondary database log file receiving all the appropriate data since the previous synchronous mirroring.

Figure 2:
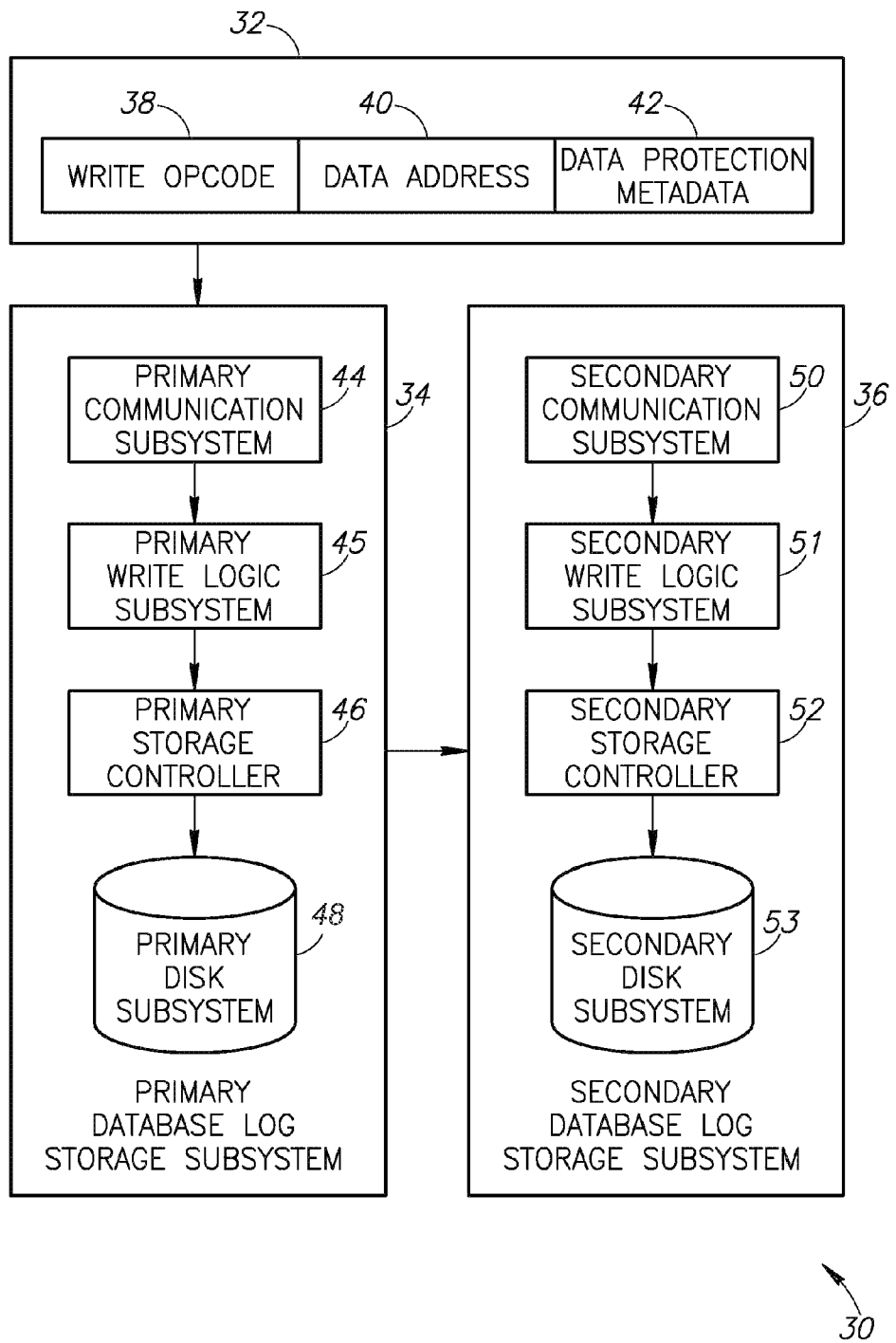
FIG. 2 is a block diagram illustrating an example storage system suitable to implement the threshold driven log synchronization method.

A block diagram illustrating an example storage system suitable for use with the invention is shown in FIG. 2. The block diagram, generally referenced 30, comprises write instruction 32, primary database log storage subsystem 34 and secondary database log storage subsystem 36. Write instruction 30 is further comprised of write opcode 40, data address 42 and data protection metadata 44. Primary database log storage subsystem 34 is further comprised of primary communications subsystem 44, primary write logic subsystem 45, primary storage controller 46 and primary disk subsystem 48. Secondary database log storage subsystem 36 is further comprised of secondary communications subsystem 50, secondary write logic subsystem 51, secondary storage controller 52 and secondary disk subsystem 53.

In operation, the primary communications subsystem of the primary database log storage subsystem receives a write instruction. The write instruction comprises the instruction opcode, the location of the data to be written and data protection metadata. The data protection metadata indicates what type of write is to be performed (i.e. either a write to the primary storage subsystem mirrors asynchronously to the secondary storage subsystem or a write to the primary storage subsystem which minors synchronously to the secondary storage subsystem). The primary write logic subsystem decodes the data protection metadata to determine what type of write is to be performed and the primary storage controller subsystem writes the data to the primary disk subsystem specifying either asynchronous or synchronous mirroring.

If a synchronous mirroring write instruction is received by the primary database storage subsystem, then it is forwarded to the secondary database log storage subsystem. The instruction is received by the secondary communications subsystem, and the secondary write logic subsystem identifies all data written to the primary disk subsystem since the last synchronous mirroring. The secondary storage controller then writes the identified data to the secondary disk subsystem.

When asynchronous mirroring is specified, the data is written solely to the primary storage subsystem. While the primary storage subsystem acknowledges the write, the data is mirrored to the secondary storage system sometime in the future. Therefore, the data is hardened on the primary storage subsystem but may not yet be hardened on the secondary storage subsystem. When synchronous mirroring is specified, then the data is written to the primary storage subsystem and the primary storage subsystem immediately minors the data on the secondary storage subsystem. In this case, the write acknowledgement is sent after the data is hardened on both the primary and secondary storage subsystems.

Additional details describing the operation of the storage system discussed supra can be found in U.S. application Ser. No. 12/164,446, entitled "System, Method And Computer Program Product For Performing A Data Protection Operation," incorporated herein by reference in its entirety. Other known write specification mechanisms may also be used without departing from the scope of the invention To implement asynchronous and synchronous writes to the primary and secondary database log files, one embodiment of the method utilizes the "on write data protection specification" technique suitable for use with the invention as taught in U.S. application Ser. No. 12/164,446 cited supra. This enables two different types of commits that can be performed when updating the database log file. The application indicates whether the commit is either a normal commit or a critical commit. The difference is that critical commits propagate their transactions to the secondary storage subsystem (including all transactions leading up to it), and there is no risk of transaction loss. Transactions in a normal commit are sent asynchronously (i.e. the primary storage subsystem minors the transactions asynchronously). In this case, the secondary storage subsystem may not have received these transactions in the event of a primary storage subsystem failure.

The importance of any given commit can be evaluated by the application, based on the application's considerations. The application can also evaluate the importance in a cumulative fashion. The idea is that the application maintains a cumulative counter of the potential damage that can be caused by the loss of the transaction. The application will modify the damage counter when committing every transaction. For most of the commit entries it will use the normal commit. Therefore most data writes are hardened with asynchronous remote replication. This improves database performance and keeps the potential damage from disaster at the primary site within a controllable bound.

In one embodiment, the parameter used is a damage threshold (e.g., monetary or a defined quantity of data). To implement a damage threshold parameter, a damage counter is initialized for the parameter to be monitored. For each new database commit log entry, the damage counter is incremented according to the value of the transaction. While the damage counter is less than or equal to the predefined threshold, the data block is written with the log entry specifying an asynchronous write (i.e. only to the primary log file). When the damage counter exceeds a predefined threshold, the data block with is written with the log entry specifying synchronous replication (i.e. update the mirrored secondary log file synchronously), and the damage counter is reinitialized.

In a second embodiment, the parameter used is a physical data threshold. For example, the log data is mirrored upon reaching the end of a data track (i.e. reaching the physical data threshold is detected and handled by the host). In this case we will specify in the write command specifies a synchronous replication, copying the entire track.

A third embodiment of the method uses multiple parameters to determine when to update the log cache. For example, the parameters are set to be (1) a specific transaction value and (2) one data track. For each new commit entry with transaction value that exceeds the predefined threshold, the block is written with the log entry specifying synchronous replication to the mirrored log file. In addition, when the last data block of a data track is written to the primary log file, the block is written with the log entry specifying synchronous replication to the mirrored log file. In all other cases, the data block is written with the log entry specifying asynchronous replication (i.e. data is written to the primary log file and mirrored asynchronously to the secondary log file).

Figure 3:
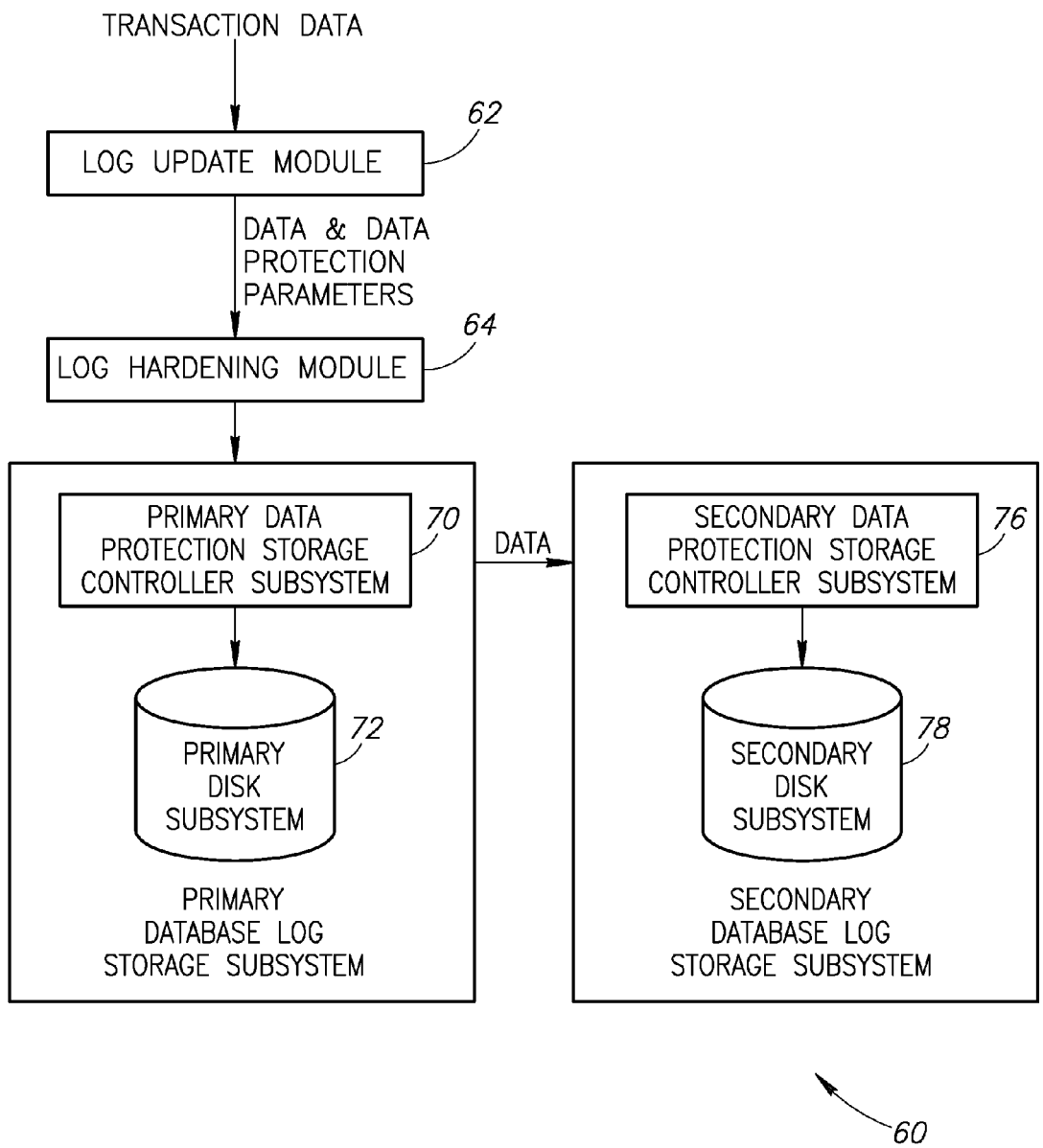
FIG. 3 is a block diagram illustrating an example computer processing system adapted to implement the threshold driven log synchronization method.

A block diagram illustrating an example implementation of threshold driven log synchronization method is shown in FIG. 3. The system block diagram, generally referenced 60, comprises log update module 62, log hardening module 64, primary database log storage subsystem 66 and secondary database log storage subsystem 68. Primary database log storage subsystem 66 is further comprised of primary data protection storage controller subsystem 70 and primary disk subsystem 72. Secondary database log storage subsystem 68 is further comprised of secondary data protection storage controller subsystem 76 and secondary disk subsystem 78.

In operation, the log update module receives transaction data from a database system. The log update module forwards the received data to the log hardening module which determines if the write instruction to the primary database log storage subsystem specifies either asynchronous or synchronous mirroring. For an asynchronous update, the primary data protection storage controller subsystem writes the transaction data to the primary disk subsystem and data is being mirrored asynchronously to the secondary database storage subsystem. For a synchronous update, the primary data protection storage controller subsystem writes the transaction data to the primary disk subsystem and sends a synchronous mirror instruction to the secondary database log storage subsystem. The secondary data protection storage controller subsystem received the instruction and writes all non-mirrored data (i.e. data received by the log update module since the most recent synchronous mirroring) to the secondary disk subsystem.

Figure 4:
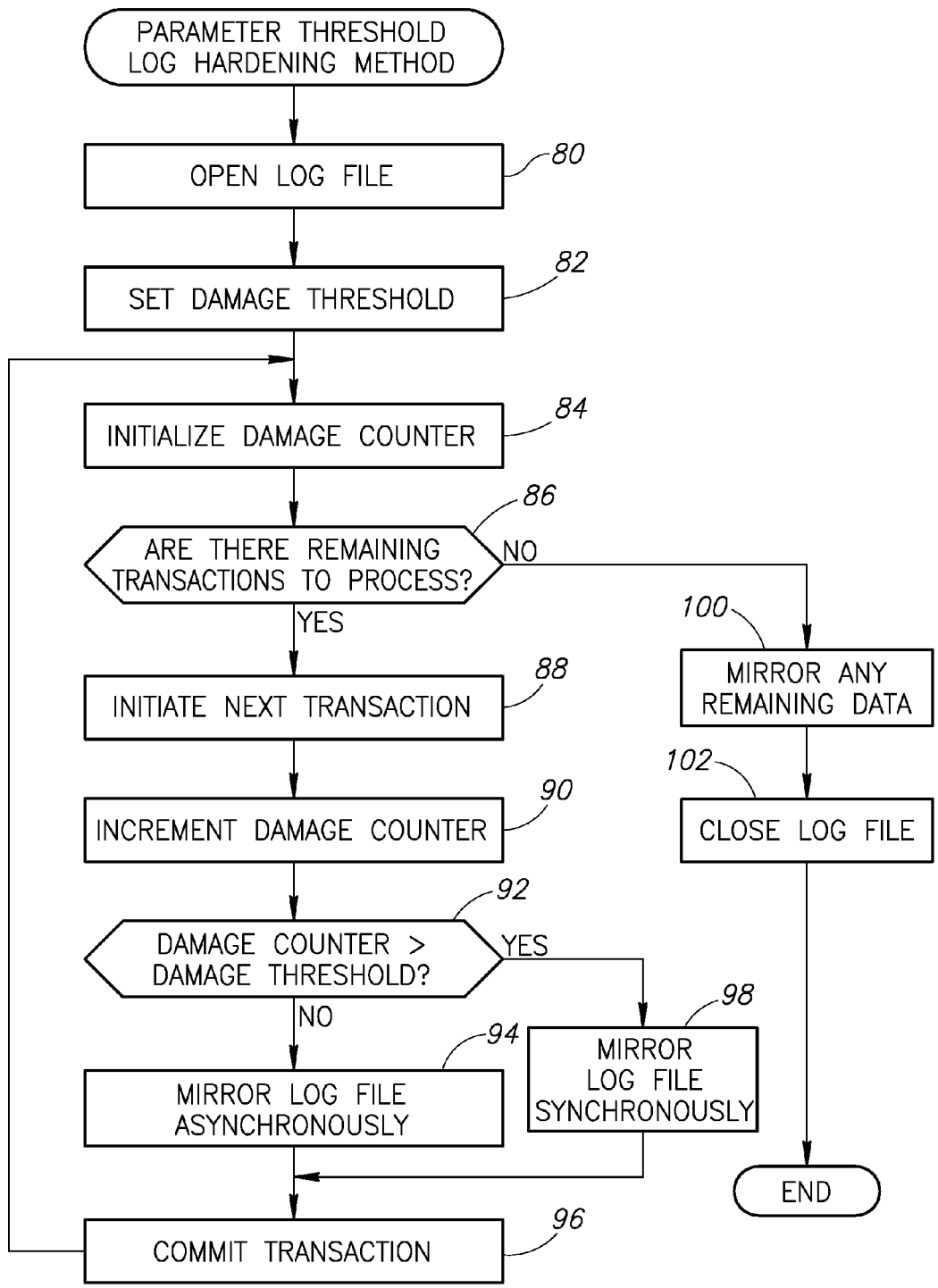
FIG. 4 is a flow diagram illustrating the damage threshold driven log synchronization method.

A flow diagram illustrating the method with a damage threshold parameter is shown in FIG. 4. First the log file is opened (step 80), the damage threshold is set (step 82), and the damage counter is initialized (step 84). If there are transactions to be processed (step 86) then the next transaction is initiated (step 88) and the damage counter is incremented (step 90). If the damage counter does not exceed the damage threshold (step 92) then the log file is mirrored asynchronously (step 94) and the transaction is committed (step 96). If the damage counter exceeds the damage threshold (step 92) then the log file is mirrored synchronously (step 98) and the method returns to step 96. Finally, if there are no more transactions to process (step 86), then any non-mirrored data is mirrored to the secondary log file (step 100) and the log file is closed (step 102).

Figure 5:
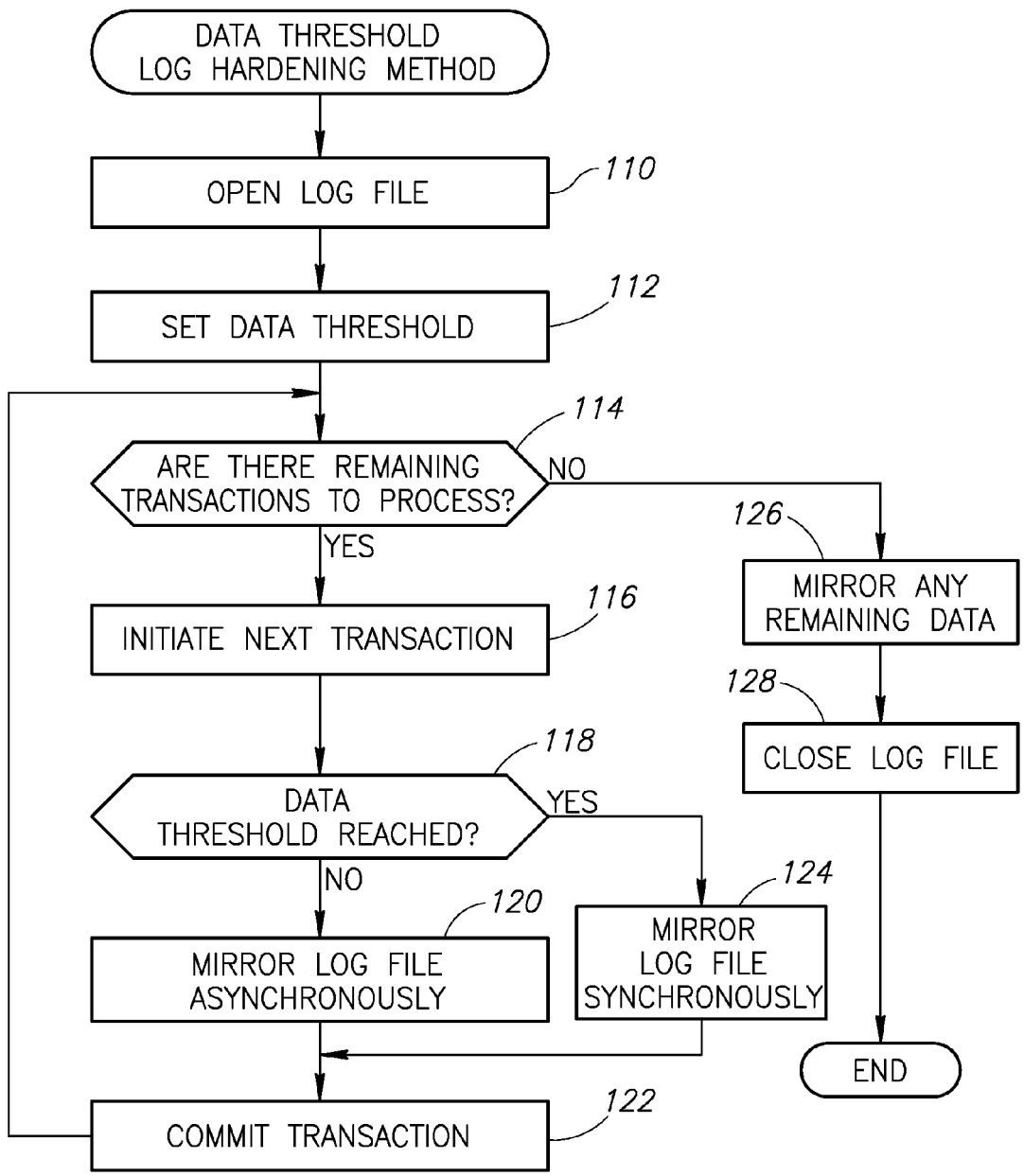
FIG. 5 is a flow diagram illustrating the data threshold driven log synchronization method.

A flow diagram illustrating the method with a physical data threshold parameter is shown in FIG. 5. First the log file is opened (step 110) and the data threshold is set (step 112). If there are transactions to be processed (step 114) then the next transaction is initiated (step 116). If the data threshold (e.g., reaching the end of a data track) is reached (step 118) then the log file is mirrored synchronously (step 124) and the transaction is committed (step 122). If the damage threshold is not yet reached (step 118) then the log file is mirrored asynchronously (step 120) and the method continues to step 122 Finally, if there are no more transactions to process (step 114), then any non-mirrored data is mirrored to the secondary log file (step 126) and the log file is closed (step 128).

Figure 6:
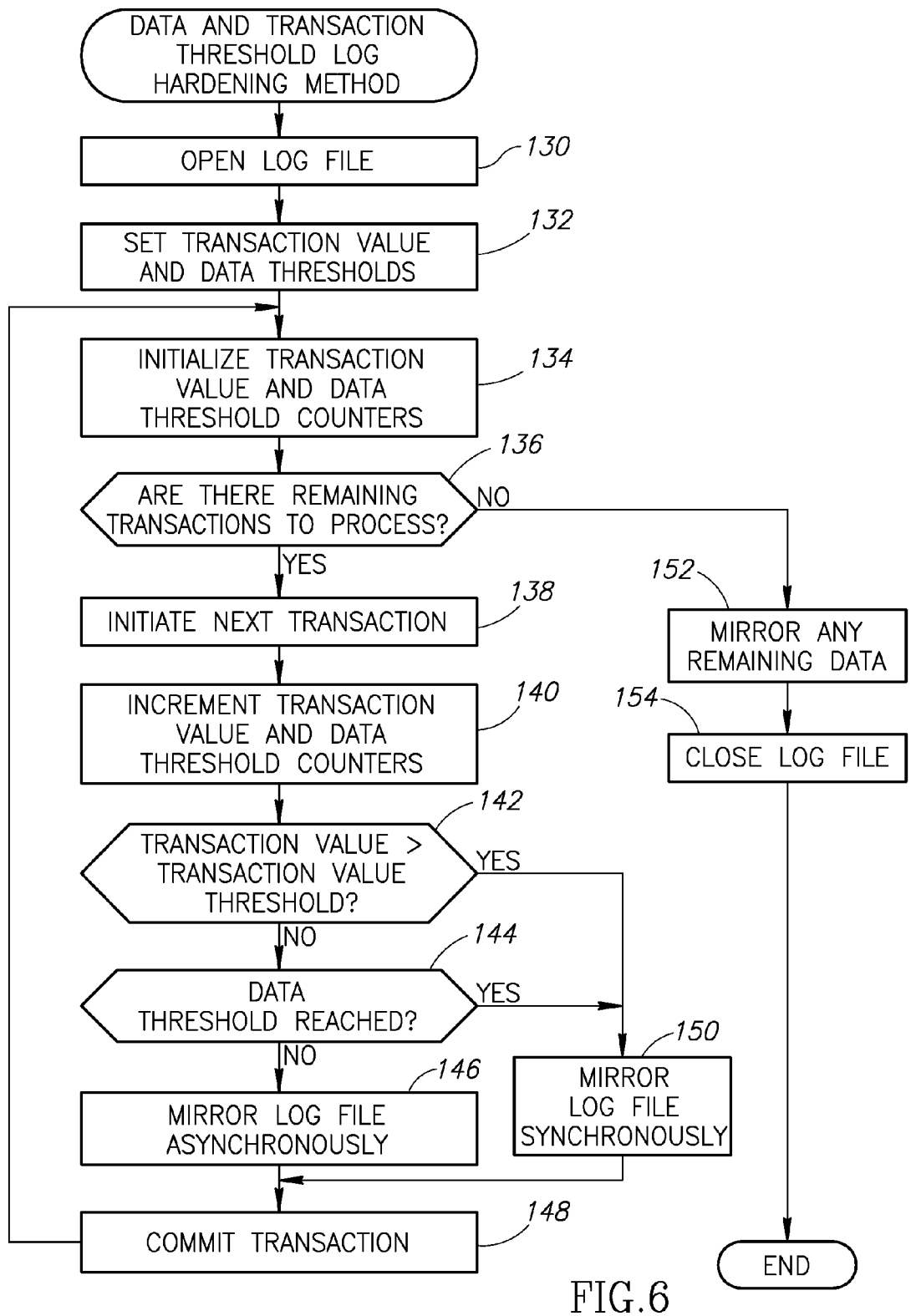
FIG. 6 is a flow diagram illustrating the data and transaction threshold driven log synchronization method of the invention.

A flow diagram illustrating the method with multiple parameters comprising both a data and an individual transaction value threshold is shown in FIG. 6. First the log file is opened (step 130), the data and transaction value thresholds are set (step 132), and the data and transaction threshold counters are initialized (step 134). If there are transactions to be processed (step 136) then the next transaction is initiated (step 138) and the counters are incremented (step 140). If the transaction value does not exceed the transaction threshold (step 142) and the data threshold has not been reached (step 144) then the log file is mirrored asynchronously (step 146) and the transaction is committed (step 148). If the transaction value does not exceed the transaction threshold (step 142) and the data threshold has reached (step 114), or if the transaction value exceeds the transaction threshold (step 142), then the log file is mirrored synchronously (step 150) and the method returns to step 148. Finally, if there are no more transactions to process (step 136), then any non-mirrored data is mirrored to the secondary log file (step 152) and the log file is closed (step 154).

The corresponding structures, materials, acts, and equivalents of all means or step plus function elements in the claims below are intended to include any structure, material, or act for performing the function in combination with other claimed elements as specifically claimed.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of mirroring log data from a primary storage subsystem to a secondary storage subsystem, the method comprising:
   initiating a transaction;
   determining a value of the transaction;
   adding the value of the transaction to a cumulative value of transaction values since a most recent synchronous mirroring;
   performing an asynchronous mirroring of said log data when the cumulative value does not exceed a damage threshold; and
   performing a synchronous mirroring of said log data when the cumulative value exceeds the damage threshold;
   wherein the cumulative value is determined by incrementing a counter according to the value of the transaction;
   wherein said counter is reset after performing the synchronous mirroring.

2. The method according to claim 1, wherein said log data is stored in a sequential database log file.

3. The method according to claim I, wherein said transaction comprises one or more database transactions.

4. The method according to claim 1, wherein the value of the transaction is selected from a group consisting of a monetary value of the transaction and a quantity of data in the transaction.

5. The method according to claim 1, wherein incrementing said counter comprises:
   receiving said log data; and updating said counter with information derived from said received log data.

6. The method according to claim 1, wherein said performing the synchronous mirroring comprises updating said secondary storage system with log data received by the primary storage system after a most recent mirroring.

7. A computer program product for mirroring log data from a primary storage subsystem to a secondary storage subsystem, comprising:
   a non-transitory computer usable medium having computer usable code embodied therewith, the computer program product comprising;
   computer usable code configured for initiating a transaction;
   computer usable code configured for determining a value of the transaction;
   computer usable code configured for adding the value of the transaction to a cumulative value of transaction values since a most recent synchronous mirroring;
   computer usable code configured for asynchronously mirroring of said log data when the cumulative value does not exceed a damage threshold;
   computer usable code configured for synchronously mirroring said log data when the cumulative value exceeds the damage threshold;
   wherein the cumulative value is determined by incrementing a counter according to the value of the transaction;
   wherein said counter is reset after performing the synchronous mirroring.

8. The computer program product according to claim 7, wherein said log data is stored in a sequential database log file.

9. The computer program product according to claim 7, wherein said data comprises one or more database transactions.

10. The computer program product according to claim 7, wherein the value of the transaction is selected from a group consisting of a monetary value of the transaction and a quantity of data in the transaction.

11. The computer program product according to claim 7, wherein incrementing said counter comprises:
   computer usable code configured for receiving said log data; and
   computer usable code configured for updating said one or more counters with information derived from said received log data.

12. The computer program product according to claim 7, wherein said computer usable code configured for synchronously mirroring updates said secondary storage system with log data received by the primary storage system after a most recent synchronous mirroring.

13. A method of mirroring database transaction log data from a primary storage subsystem to a secondary storage subsystem, the method comprising:
   initializing a damage counter;
   initiating several transactions;
   upon initiating each transaction, determining a value of the transaction;
   upon determining the value of each transaction, updating the damage counter based on the value of the transaction to a cumulative value of the transactions processed after a most recent synchronous mirroring; and
   performing a synchronous mirroring of said log data when a value of said damage counter is greater than a damage threshold;
   wherein the cumulative value is determined by incrementing a counter according to the value of the transaction;
   wherein said counter is reset after performing the synchronous mirroring.

14. The method according to claim 13, wherein said database transaction log data is stored in a sequential file.

15. The method according to claim 13, wherein the value of the transaction is based on a quantity of the log data, wherein said updating the damage counter comprises:
   receiving said transaction log data; and
   updating said damage counter with the quantity of said received transaction log data.

16. The method according to claim 13, wherein said step of mirroring comprises the step of updating said secondary storage system with log data received after said most recent synchronous mirroring.

17. A method of mirroring database transaction log data from a primary storage subsystem to a secondary storage subsystem, the method comprising:
   initiating a transaction;
   determining whether a physical data threshold is reached;
   performing an asynchronous mirroring of said log data when the physical data threshold is not yet reached; and
   performing a synchronous mirroring of said log data when said physical dam threshold is reached;
   wherein the cumulative value is determined by incrementing a counter according to the value of the transaction;
   wherein said counter is reset after performing the synchronous mirroring.

18. The method according to claim 17, wherein said database transaction log data is stored in a sequential file.

19. The method according to claim 17, wherein said physical data threshold comprises one or more data tracks, each said track comprising a circular segment of a fixed disk comprising a consecutive set of sectors.

20. The method according to claim 19, wherein the one or more data tracks are copied during the synchronous mirroring.

21. The method according to claim 17, wherein said step of performing the synchronous mirroring comprises the step of updating said secondary storage system with log data received after said most recent synchronous mirroring.

* * * * *